United States Patent
Sato et al.

(10) Patent No.: US 8,678,969 B2
(45) Date of Patent: Mar. 25, 2014

(54) VEHICULAR DRIVE SYSTEM

(75) Inventors: Akihiro Sato, Nagoya (JP); Hiroyuki Ishii, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/005,290

(22) PCT Filed: Mar. 23, 2011

(86) PCT No.: PCT/JP2011/057053
§ 371 (c)(1),
(2), (4) Date: Sep. 16, 2013

(87) PCT Pub. No.: WO2012/127668
PCT Pub. Date: Sep. 27, 2012

(65) Prior Publication Data
US 2014/0004987 A1    Jan. 2, 2014

(51) Int. Cl.
*F16H 48/30*    (2012.01)

(52) U.S. Cl.
USPC .......................................... 475/150

(58) Field of Classification Search
USPC ................................. 475/150, 151
See application file for complete search history.

(56) References Cited

U.S. PATENT DOCUMENTS

| | | | |
|---|---|---|---|
| 7,220,207 B2 * | 5/2007 | Yamamoto | 475/150 |
| 2003/0203782 A1 * | 10/2003 | Casey et al. | 475/150 |
| 2006/0046887 A1 * | 3/2006 | Bennett | 475/150 |

FOREIGN PATENT DOCUMENTS

| | | |
|---|---|---|
| JP | A-10-278603 | 10/1998 |
| JP | A-2010-206893 | 9/2010 |
| JP | A-2011-179668 | 9/2011 |

* cited by examiner

*Primary Examiner* — Edwin A Young
(74) *Attorney, Agent, or Firm* — Oliff, PLC

(57) ABSTRACT

A vehicular drive system provided with an electric motor for generating a drive force to be transmitted to drive wheels, includes: the electric motor including an output rotary member having opposite end portions from which the drive force of the electric motor is transmitted to the drive wheels; two power connecting/disconnecting devices respectively configured to selectively connect and disconnect each of the opposite end portions of the output rotary member to and from the drive wheels; and the two power connecting/disconnecting devices being controlled to selectively connect the opposite end portions of the output rotary member to the drive wheels, for thereby changing a ratio of rotating speeds of the drive wheels to an operating speed of the electric motor.

6 Claims, 6 Drawing Sheets

VEHICULAR DRIVE SYSTEM

TECHNICAL FIELD

The present invention relates to a mechanical arrangement of a vehicular drive system including an electric motor for generating a drive force to be transmitted to drive wheels.

BACKGROUND ART

There is known a vehicular drive system including an electric motor for generating a drive force to be transmitted to drive wheels. Patent Document 1 discloses an example of such a vehicular drive system in the form of a drive system for an electric vehicle. In the electric vehicle drive system disclosed in this Patent Document 1, an output rotary member of the above-indicated electric motor, namely, an output shaft of the electric motor is connected at one end portion thereof to the drive wheels through a speed reducing mechanism. The output shaft of the electric motor is not connected at the other end portion. That is, the drive force of the above-described electric motor is transmitted from only the above-indicated one end portion to the drive wheels, but is not transmitted from the above-indicated other end portion to the drive wheels.

PRIOR ART DOCUMENTS

Patent Documents

Patent Document 1: JP-10-278603A
Patent Document 2: JP-2010-206893A

SUMMARY OP THE INVENTION

Object Achieved by the Invention

In the electric vehicle drive system disclosed in the above-identified Patent Document 1 by way of example wherein the drive force of the above-indicated electric motor is transmitted from only one end portion of its output shaft to the above-indicated drive wheels, a power transmitted mechanism such as the above-indicated speed reducing mechanism and a transmission for transmitting the above-indicated drive force is disposed on the side of the above-indicated one end portion of the output shaft of the electric motor, and is not disposed on the side of the other end portion. For example, the electric vehicle drive system wherein the transmission is disposed on the side of one end portion of the output shaft of the above-indicated electric motor is installed on a vehicle as shown in FIG. 9, which is an illustration of the vehicle on which the conventional electric vehicle drive system is installed. In this electric vehicle drive system, a drive force of an electric motor 900 is transmitted to drive wheels 904 through a transmission 902, as shown in FIG. 9. Since the transmission 902 is disposed on one side of the electric motor 900, there is a limitation in the position of installation of the electric motor 900 which has a larger weight than the transmission 902 and other devices. This limitation gives rise to a problem that the electric motor 900 cannot be installed at a desired position on the vehicle. Regarding FIG. 9 if the electric motor 900 could be installed in the middle of the vehicle in the lateral direction, that is, in the width direction (indicated by en arrow AR901 in FIG. 9) of the vehicle, it would be easy to design the vehicle so as to ensure a good balance of weight and to reduce vibrations and noises of the vehicle. However, it is difficult to install the electric motor 900 in the middle of the vehicle in the above-indicated width direction. In this respect, it is noted that this problem has not been addressed.

The present invention was made in view of the background art described above. It is therefore an object of the present invention to provide a vehicular drive system which has a reduced degree of design limitation in the position of installation of an electric motor provided to generate a drive force to be transmitted to drive wheels.

Means for Achieving the Object

The object indicated above is achieved according to a first aspect of the present invention, which provides (a) a vehicular drive system provided with an electric motor for generating a drive force to be transmitted to drive wheels, characterized in that (b) the electric motor has an output rotary member having one end portion and the other end portion from which the drive force of the electric motor is transmitted, (c) each of the one end portion and the other end portion of the output rotary member is selectively connectable and disconnectable to and from the above-described drive wheels, and (d) the one end portion and the other end portion of the output rotary member are selectively connected to the drive wheels, for thereby changing a ratio of rotating speeds of the above-described drive wheels to an operating speed of the above-described electric motor.

Advantages of the Invention

The vehicular drive system described above is configured to transmit the drive force of the above-described electric motor from a selected one of the above-described one end portion and the above-described other end portion of the electric motor, making it possible to prevent an undesirable positioning of a power transmitting device such as a transmission provided to transmit the drive force of the electric motor to the drive wheels, such that the power transmitting device is disposed on one side of the above-described electric motor. Therefore, the present vehicular drive system has a reduced degree of design limitation in the position of installation of the electric motor on a vehicle. For instance, the electric motor can be disposed at a midpoint in the width direction of the vehicle, where the above-described electric motor is installed on the vehicle such that the axial direction of the above-described output rotary member is parallel to the width direction of the vehicle.

According to a second aspect of this invention, the vehicular drive system according to the first aspect of the invention is provided with (a) a differential gear device having an axis of rotation parallel to an axis of rotation of the output rotary member of the electric motor and configured to transmit the drive force of the above-described electric motor to the above-described drive wheels, and (b) the vehicular drive system is arranged such that the above-described electric motor is positioned so as to overlap with the differential gear device in a direction perpendicular to the axis of rotation of the differential gear device. According to this aspect of the invention, a large amount of an oil splashed up by a rotary motion of the differential gear device can be easily supplied to the above-described electric motor, so that the electric motor can be cooled with a high degree of efficiency. For instance, the above-described electric motor and the above-described differential gear device are accommodated together in a single housing such that the differential gear device is entirely or partially immersed in the oil within the housing.

According to a third aspect of the invention, the vehicular drive system according to the second aspect of the invention is configured such that the above-described electric motor is positioned in a vehicle on a front side of the above-described differential gear device. According to this aspect of the invention, the above-described electric motor can be cooled more effectively than the above-described differential gear device, with an air introduced into the vehicle through its front portion during forward running of the vehicle, since the vehicle runs more frequently in the forward direction than in the backward direction. Consequently, the efficiency of cooling of the above-described electric motor can be made higher than in the case where the electric motor is positioned in the vehicle on the rear side of the above-described differential gear device.

According to a fourth aspect of the invention, the vehicular drive system according to any one of the first through third aspects of the invention is configured such that (a) a first power connecting/disconnecting device for selectively connecting and disconnecting the above-described one end portion of the output rotary member to and from the above-described drive wheels is interposed between the one end portion and a gear located nearest to the above-described electric motor in a power transmitting path between the one end portion and the drive wheels, (b) while a second power connecting/disconnecting device for selectively connecting and disconnecting the above-described other end portion of the output rotary member to and from the above-described drive wheels is interposed between the other end portion and a gear located nearest to the above-described electric motor in a power transmitting path between the other end portion and the drive wheels. According to this aspect of the invention, when the first power connecting/disconnecting device connects the above-indicated one end portion to the above-indicated drive wheels, the transmission of the drive force from the above-described output rotary member of the electric motor to the gear located nearest to the above-described electric motor in the power transmitting path from the above-indicated other end portion to the drive wheels is prevented by the second power connecting/disconnecting device which disconnects the above-indicated other end portion from the corresponding gear located nearest to the electric motor. When the second power connecting/disconnecting device connects the above-indicated other end portion to the above-described drive wheels, the transmission of the drive force from the output rotary member of the electric motor to the gear located nearest to the electric motor in the power transmitting path from the above-indicated one end portion to the drive wheels is prevented by the first power connecting/disconnecting device which disconnects the above-indicated one end portion from the corresponding gear located nearest to the electric motor. Therefore, it is possible to reduce generation of a tooth contacting sound of the gears not operating for transmitting the drive force, which would take place when the electric motor has a torque variation, for example.

According to a fifth aspect of the invention, the vehicular drive system according to any one of the first through fourth aspects of the invention is configured such that (a) the ratio of the rotating speeds of the above-described drive wheels to the operating speed of the above-described electric motor is changed by selectively establishing one of a plurality of predetermined speed positions, (b) a part of a power transmitting path between the above-described one end portion of the output rotary member and the above-described drive wheels is constituted by a first transmission portion configured to establish odd-numbered speed positions of the above-described plurality of predetermined speed positions, and a first power connecting/disconnecting device which is connected in series to the above-described first transmission portion and which is configured to selectively connect and disconnect the above-described one end portion of the output rotary member to and from the above-described drive wheels; and (c) a part of a power transmitting path between the above-described other end portion of the output rotary member and the above-described drive wheels is constituted by a second transmission portion configured to establish even-numbered speed positions of the above-described plurality of predetermined speed positions, and a second power connecting/disconnecting device which is connected in series to the above-described second transmission portion and which is configured to selectively connect and disconnect the above-described other end portion of the output rotary member to and from the above-described drive wheels. According to this aspect of the invention, the above-described first and second power connecting/disconnecting devices can be designed to be more easily positioned for compact construction of the vehicular drive system, than where the above-described first and second transmission portions are positioned only on the side of one or the other end portion of the output rotary member.

According to a sixth aspect of the invention, the vehicular drive system according to any one of the first through fifth aspects of the invention is configured such that (a) the ratio of the rotating speeds of the above-described drive wheels to the operating speed of the above-described electric motor is highest when the above-described one end portion of the output rotary member is connected to the drive wheels while the above-described other end portion of the output rotary member is disconnected from the drive wheels, and (b) a seat for an operator of a vehicle is positioned nearer to said other end portion of the output rotary member than to the above-described one end portion. In the vehicular drive system according to this aspect of the invention, noises and vibrations generated on the side of the above-indicated one end portion tend to be larger than those generated on the side of the above-indicated other end portion, due to a difference between the two values of the above-described speed ratio regarding the respective two end portions. However, the above-described vehicle operator's seat is positioned more distant from the above-indicated one end portion at which the generated noises and vibrations are larger, so that deterioration of the vehicle driving comfort as felt by the vehicle operator due to the noises and vibrations can be reduced.

In one preferred form of the invention, the above-described differential gear device is positioned at a midpoint between the above-indicated pair of drive wheels. In this form of the invention, a pair of drive axles (drive shafts) for connecting the differential gear device to the respective drive wheels can be made identical in construction with each other.

In another preferred form of the invention, the above-described electric motor, the above-described first transmission portion, the above-described second transmission portion and the above-described differential gear device are accommodated in one housing, and the first transmission portion is positioned in a lower portion of the vehicle than the second transmission portion. In this form of the invention, the first transmission portion which is assigned to establish comparatively low speed positions and tends to generate a larger amount of heat than the second transmission portion can be efficiently cooled with an oil splashed up by a rotary motion of the differential gear device, which oil is easily supplied to the first transmission portion by an amount larger than an amount to be supplied to the second transmission portion.

In a further preferred form of the invention, each of at least one of the above-described first transmission portion and the above-described second transmission portion is a vehicular transmission of a permanent meshing type provided with a plurality of pairs of gears which have respective different gear ratios and which are selectively brought into power transmitting state to establish respective speed positions.

MODE FOR CARRYING OUT THE INVENTION

Embodiments of the present invention will be described in detail by reference to the drawings.

First Embodiment

Figure 1:
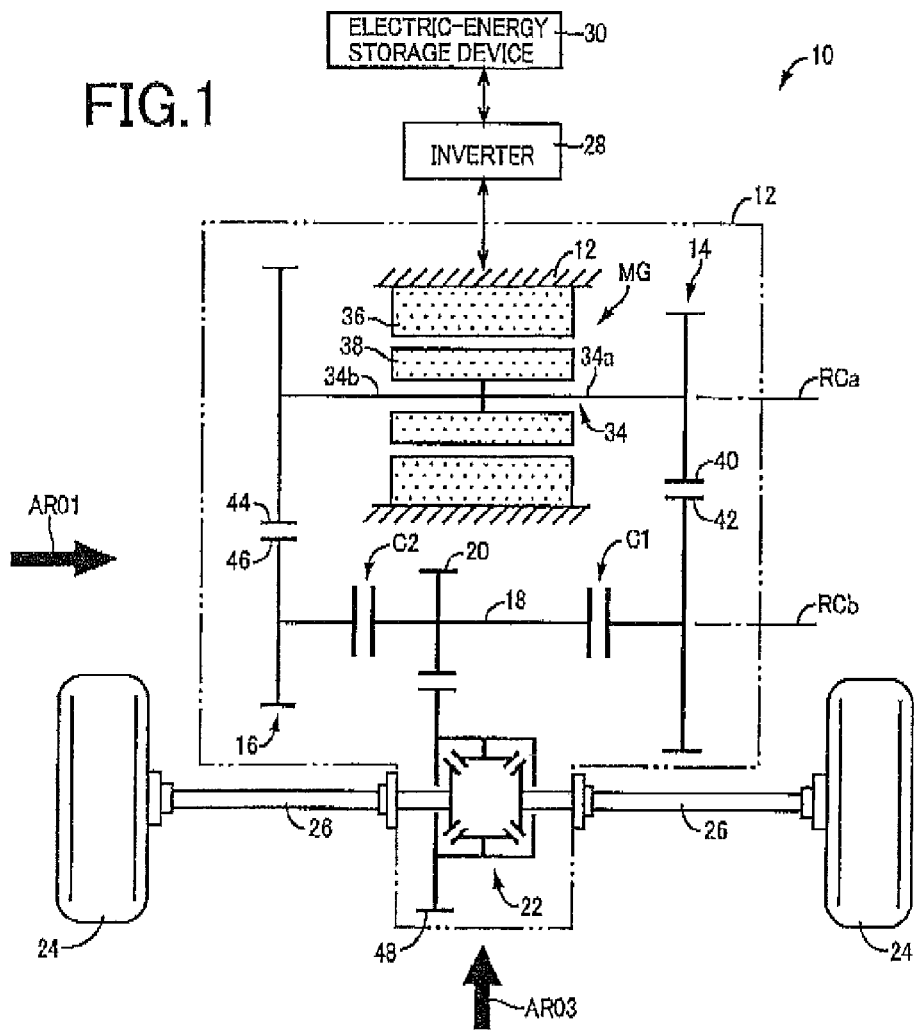
FIG. 1 is a schematic view for explaining a vehicular drive system according to a first embodiment of the invention.

FIG. 1 is the schematic view for explaining a vehicular drive system 10 constructed according to the principle of this invention. In FIG. 1, RCa represents a first axis which is an axis of rotation of an electric motor MG, while RCb represents a second axis which is an axis of rotation of a counter shaft 18. These first axis RCa and second axis RCb, and axes of drive axles 26 are shown in the same plane in the plan view of FIG. 1, which do not lie in a single plane, as is apparent from FIG. 2 referred to later.

As shown in FIG. 1, the vehicular drive system 10 has a stationary member in the form a of a transaxle casing (T/A casing) 12 (hereinafter referred to as "casing 12") fixed to the body of a vehicle by bolts or any other fixing means. Within the casing 12 serving as a housing of the vehicular drive system 10, there are disposed the electric motor MG, a first transmission portion 14, a second transmission portion 16, a first clutch C1, a second clutch C2, the counter shaft 18, an intermediate gear 20 and a differential gear device (differential gear) 22. In the vehicular drive system 10, the above-indicated first axis RCa, the above-indicated second axis RCb, and an axis of rotation of the differential gear device 22 are parallel to each other. For instance, the vehicular drive system 10 is installed transversely on a front-drive vehicle 8 (shown in FIG. 3) provided with a drive power source disposed in its front portion, for example, such that the vehicular drive system 10 is suitably used to drive drive wheels 24. To transmit a drive force of the electric motor MG to the drive wheels 24 in the vehicular drive system 10, the first clutch C1 or the second clutch C2 is selectively placed in its engaged state. When the first clutch C1 is placed in the engaged state while the second clutch C2 is placed in the released state, for example, the drive force of the above-indicated electric motor MG is transmitted from an output rotary member 34 of the electric motor MG to the pair of drive wheels 24 via the first transmission portion 14, first clutch C1, intermediate gear 20, differential gear device 22, and the pair of drive axles (drive shafts) 26 provided to connect the differential gear device 22 to the respective drive wheels 24, in this order of description. When the first clutch C1 is placed in the released state while the second clutch C2 is placed in the engaged state, on the other hand, the drive force of the above-indicated electric motor MG is transmitted from its output rotary member 34 to the pair of drive wheels 24 via the second transmission portion 16, second clutch C2, intermediate gear 20, differential gear device 22 and the pair of drive axles 26, in this order of description.

The electric motor MG, which has the first axis RCa as a rotation axis, is a so-called motor/generator having a function of an electric motor to generate a vehicle drive force to be transmitted to the drive wheels 24, and also a function of an electric generator. Described more specifically, the electric motor MG is a three-phase synchronous electric motor/generator provided with: an electric motor stator 36 having three-phase coils fixed to the inside of the casing 12 by bolts or any other fixing means; the above-indicated output rotary member 34 disposed within the electric motor stator 36 as an electric motor output shaft rotatable about the first axis RCa relative to the electric motor stator 36; and an electric motor rotor 38 disposed within the electric motor stator 36, fixed to the radially outer portion of the output rotary member 34, and having a permanent magnet. The electric motor MG is electrically connected through an inverter 28 to an electric-energy storage device 30, such that the electric motor MG and the electric-energy storage device 30 can supply and receive an electric energy to and from each other. For example, the above-indicated electric-energy storage device 30 is a battery (secondary battery) such as a lead acid battery, or a capacitor, which serves as an electric energy source from which the electric energy can be supplied to the electric motor MG, and to which the electric energy can be supplied from the electric motor MG.

The output rotary member 34 of the electric motor MG projects from the opposite axial ends of the electric motor MG in the direction of the first axis RCa. The drive force of the electric motor MG is transmitted from the opposite end portions of the output rotary member 34. One of the opposite end portions of the output rotary member 34 functions as a first output shaft 34a from which the drive force of the electric motor MG is transmitted to the first transmission portion 14, while the other end portion of the output rotary member 34 functions as a second output shaft 34b from which the drive force of the electric motor MG is transmitted to the second transmission portion 16. Namely, the first output shaft 34a and the second output shaft 34b are rotated as a unit about the first axis RCa.

The first transmission portion 14 is disposed on one side of the electric motor MG on which the first output shaft 34a is disposed, and is provided with a first input gear 40 rotatable about the first axis RCa, and a first output gear 42 rotatable about the second axis RCb. These first input and output gears 40 and 42 mesh with each other and constitute a pair of gears (a gear pair). The first input gear 40 is connected in series with the first output shaft 34a on the first axis RCa. The first transmission portion 14 has a constant speed ratio γa (=rotating speed of the first input gear 40/rotating speed of the first output gear 42), which can be calculated on the basis of the number of teeth of the first input gear 40 and the number of teeth of the first output gear 42.

The second transmission portion 16 is disposed on the other side of the electric motor MG on which the second output shaft 34b is disposed, and is provided with a second input gear 44 rotatable about the first axis RCa, and a second output gear 46 rotatable about the second axis RCb. These second input and output gears 44 and 46 mesh with each other and constitute a pair of gears. The second input gear 44 is connected in series with the second output shaft 34b on the first axis RCa. The second transmission portion 16 has a constant speed ratio γb (=rotating speed of the second input gear 44/rotating speed of the second output gear 46), which is lower than the above-indicated gear ratio γa and which can be calculated on the basis of the number of teeth of the second input gear 44 and the number of teeth of the second output gear 46. Thus, the first input gear 40, output rotary member 34 and second input gear 44 are connected in series with each other in this order of description from the side of the first transmission portion 14, and are supported by the casing 12 such that the first input gear 40, output rotary member 34 and second input gear 44 are not rotatable relative to each other about the first axis RCa, that is, are rotatable as a unit.

The intermediate gear 20 is fixed to the counter shaft 18, and is supported by the casing 12 such that the intermediate gear 20 is rotatable with the counter shaft 18 about the second axis RCb. These counter shaft 18 and intermediate gear 20 are interposed between the above-indicated first and second output gears 42, 46 in the direction of the second axis RCb. The intermediate gear 20 meshes with a differential ring gear 48 of the differential gear device 22, so that the drive force generated from the electric motor MG and received by the counter shaft 18 through the first transmission portion 14 or second transmission portion 16 is transmitted to the drive wheels 24.

Each of the first clutch C1 and second clutch C2 is a frictional coupling device of a wet multiple-disc type having a plurality of friction plates which are superposed on each other and forced against each other by a hydraulic actuator, which is hydraulically controlled to place the frictional coupling device in its engaged or released state. The first and second clutches C1, C2 permit transmission of a drive force therethrough, when they are placed in the engaged state, and inhibit the transmission of the drive force when they are placed in the released state. A torque capacity of each clutch C1, C2 is adjustable according to a degree of slipping of the clutch C1, C2.

The first clutch C1 is interposed between the above-indicated first output gear 42 and the counter shaft 18 in the direction of the second axis RCb, for selectively connecting the first output gear 42 and the counter shaft 18 to each other. Namely, the first clutch C1 functions as a first power connecting/disconnecting device operable to place a power transmitting path from the first output shaft 34a of the electric motor MG to the drive wheels 24, in a power transmitting state or a power shut-off state. In other words, the first output shaft 34a which is one end portion of the above-described output rotary member 34 is selectively connectable and disconnectable to and from the drive wheels 24 by the first clutch C1. On the other hand, the second clutch C2 is interposed between the above-indicated second output gear 46 and the counter shaft 18 in the direction of the second axis RCb, for selectively connecting the second output gear 46 and the counter shaft 18 to each other. Namely, the second clutch C2 functions as a second power connecting/disconnecting device operable to place a power transmitting path from the second output shaft 34b of the electric motor MG to the drive wheels 24, in a power transmitting state or a power shut-off state. In other words, the second output shaft 34b which is the other end portion of the above-described output rotary member 34 is selectively connectable and disconnectable to and from the drive wheels 24 by the second clutch C2. In the vehicular drive system 10 constructed as described above, the first output gear 42, first clutch C1, intermediate gear 20, second clutch C2 and second output gear 46 are connected in series with each other in this order of description from the side of the first transmission portion 14 in the direction of the second axis RCb. The first output gear 42 and the intermediate gear 20 are rotated as a unit about the second axis RCb when the first clutch C1 is placed in the engaged state, while the second output gear 46 and the intermediate gear 20 are rotated as a unit about the second axis RCb when the second clutch C2 is placed in the engaged state.

The differential gear device 22 is connected to the pair of drive wheels 24 through the pair of drive axles 26, such that the drive force of the electric motor MG received by the differential ring gear 48 is distributed and transmitted to the pair of drive wheels 24. If a difference between the rotating speeds of the drive wheels 24 occurs, the differential gear device 22 transmits the drive force to the pair of drive wheels 24 while permitting the difference. In this respect, it is noted that the differential gear device 22 is preferably disposed at a midpoint between the pair of drive wheels 24 as shown in FIG. 1.

In the vehicular drive system 10 constructed as described above, the first transmission portion 14, second transmission portion 16, first clutch C1 and second clutch C2 cooperate to function as a two-position shifting device switchable between a low-gear position having the above-indicated speed ratio γa and a high-gear position having the above-indicated speed ratio γb. When the first clutch C1 is placed in the engaged state while the second clutch C2 is placed in the released state, for example, the shifting device is shifted to the low-gear position to establish the speed ratio γa. When the first clutch C1 is placed in the released state while the second clutch C2 is placed in the engaged state, on the other hand, the shifting device is shifted to the high-gear position to establish the speed ratio γb. That is, the vehicular drive system 10 is configured to selectively connect one end portion (first output shaft 34a) or the other end portion (second output shaft 34b) of the above-indicated output rotary member 34 to the drive wheels 24 through the first clutch C1 or second clutch C2, for thereby changing the ratio of the rotating speeds of the drive wheels 24 to the operating speed of the electric motor MG. Since the speed ratio γa of the first transmission portion 14 is higher than the speed ratio γb of the second transmission portion 16, the ratio of the rotating speeds of the drive wheels 24 to the operating speed of the electric motor MG is made higher when the above-indicated one end portion of the output rotary member 34 is connected to the drive wheels 24 while the other end portion of the output rotary member 34 is disconnected from the drive wheels 24, that is, when the first clutch C1 is placed in the engaged state while the second clutch C2 is placed in the released state.

In the present vehicular drive system 10, the power transmitting path from the electric motor MG to the drive wheels 24 is placed in the power shut-off state when both of the first and second clutches C1 and C2 are placed in the released state. When both of the first and second clutches C1 and C2 are placed in the engaged state, on the other hand, the drive wheels 24 are held in a locked state with the intermediate gear 20 being locked even while the electric motor MG is placed in a de-energized freely rotatable state. Thus, the vehicular drive system 10 has a "hill-hold" function of preventing a downward movement of the vehicle 8 on an uphill roadway, for example. To perform this hill-hold function when the first and second clutches C1 and C2 are placed in the engaged state, these clutches C1, C2 are preferably of a normally-engaged (normally-closed) type which are brought into the engaged state when no hydraulic pressure is applied to their hydraulic actuators.

Figure 2:
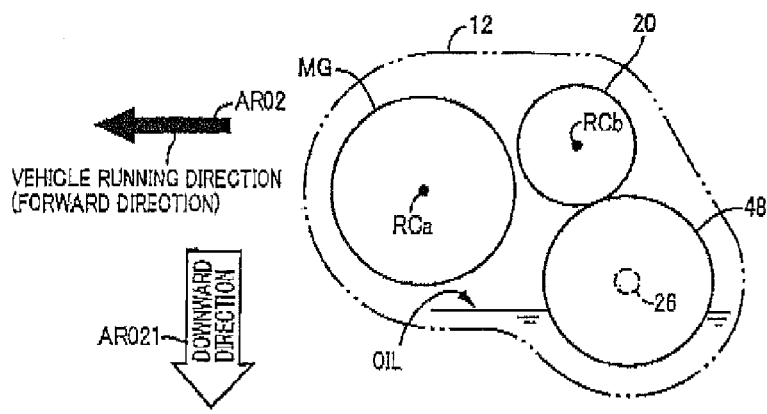
FIG. 2 is a schematic side elevational view indicating axes of the vehicular drive system of FIG. 1 as seen in the direction of a first axis from the side of a second transmission portion, as indicated by an arrow AR01 in FIG. 1.

FIG. 2 is the schematic side elevational view indicating the axes of the vehicular drive system 10 as seen in the direction of the first axis RCa from the second transmission portion 16, as indicated by an arrow AR01 in FIG. 1. An arrow AR02 in FIG. 2 represents a forward running direction of the vehicle 8, while an arrow AR021 represents a downward direction of the vehicle 8. As indicated in FIG. 2, the electric motor MG is positioned in the vehicle 8 on the front side of the differential gear device 22, and an oil (lubricant) for lubricating the vehicular drive system 10 is accommodated in a bottom part of the casing 12 so that a portion of the differential gear device 22 is immersed in the oil. The electric motor MG is positioned so as to overlap with the differential gear device 22 in the direction indicated by the arrow AR02, that is, in the forward running direction of the vehicle, as indicated in FIG. 2. The electric motor MG is positioned so as to overlap with the differential gear device 22 also in the direction perpendicular to the axis of rotation of the differential gear device 22 (in the direction indicated by an arrow AR03 in FIG. 1), as indicated in FIG. 1.

Figure 3:
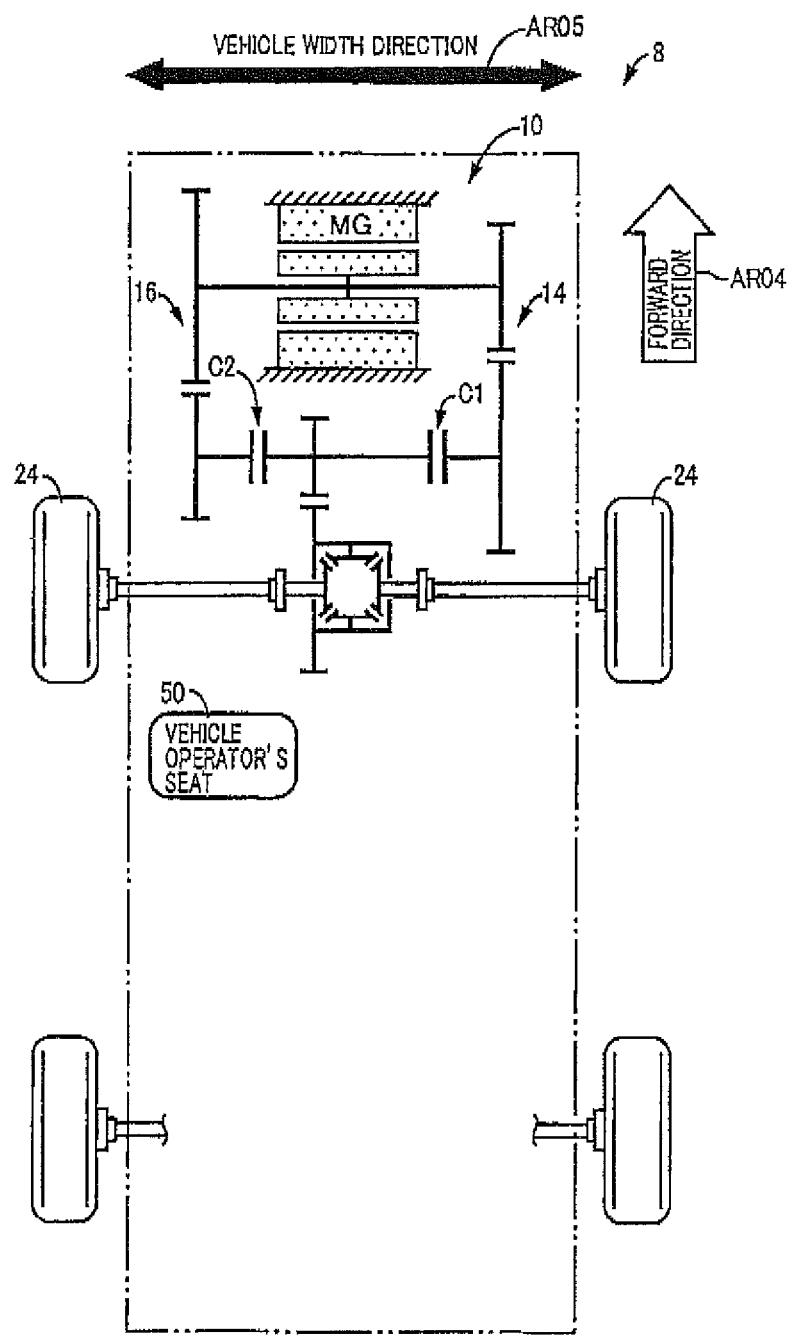
FIG. 3 is a top plan view showing an entirety of a vehicle, for explaining a positional relationship between the vehicular drive system of FIG. 1 and a vehicle operator's seat provided on the vehicle.

FIG. 3 is the top plan view showing an entirety of the vehicle 8, for explaining a positional relationship between the vehicular drive system 10 and a vehicle operator's seat 50 provided on the vehicle 8. An arrow AR04 in FIG. 3 represents the forward running direction of the vehicle 8. The vehicle operator's seat 50 is positioned within a compartment of the vehicle 8, so that an operator who operates the vehicle 8 is seated on the seat 50. Accordingly, the position of the vehicle operator's seat 50 represents the position of the vehicle operator during running of the vehicle 8. As is apparent from FIG. 3, the vehicle operator's seat 50 is positioned nearer to the second transmission portion 16 than to the first transmission portion 14. That is, the vehicle operator's seat 50 is positioned nearer to the above-indicated other end portion (second output shaft 34b) of the output rotary member 34 than to the above-indicated one end portion (first output shaft 34a) of the output rotary member 34.

The vehicular drive system 10 according to the present embodiment has the following advantages (A1) through (A5):

(A1) The present embodiment is configured such that the drive force of the electric motor MG is transmitted from the first output shaft 34a which is one end portion of the output rotary member 34 of the electric motor MG, and the second output shaft 34b which is the other end portion of the output rotary member 34, and such that the first output shaft 34a and the second output shaft 34b are selectively connectable and disconnectable to and from the drive wheels 24. The present embodiment is further configured to selectively connect the first output shaft 34a or the second output shaft 34b to the drive wheels 24, for thereby changing the ratio of the rotating speeds of the drive wheels 24 to the operating speed of the electric motor MG. Accordingly, the drive force of the electric motor MG is transmitted from a selected one of its first and second output shafts 34a, 34b, making it possible to prevent an undesirable positioning of the power transmitting device provided to transmit the drive force of the electric motor MG to the drive wheels 24, more specifically, the above-described shifting device constituted by the first transmission portion 14, second transmission portion 16, first clutch C1 and second clutch C2, such that the shifting device is disposed on one side of the electric motor MG, for example, on the side of the first output shaft 34a or the second output shaft 34b. Therefore, the present embodiment has a reduced degree of design limitation in the position of installation of the electric motor MG on the vehicle 8. For instance, the electric motor MG can be disposed at a midpoint in the width direction of the vehicle 8 (in the direction indicated by an arrow AR05 in FIG. 3), where the electric motor MG is installed on the vehicle 8 such that the axial reaction of the output rotary member 34 (the direction of the first axis RCa) is parallel to the width direction of the vehicle 8.

(A2) The present embodiment is further configured such that the differential gear device 22 has the axis of rotation parallel to the axis of rotation of the output rotary member 34 of the electric motor MG, while the electric motor MG is positioned so as to overlap with the differential gear device 22 in the direction perpendicular to the axis of rotation of the differential gear device 22 (in the direction indicated by the arrow AR03 in FIG. 1), as shown in FIG. 1. Further, the differential gear device 22 is partially immersed in the oil accommodated in the bottom part of the casing 12, so that a large amount of the oil splashed up by a rotary motion of the differential gear device 22, that is, by a rotary motion of the differential ring gear 48 can be easily supplied to the electric motor MG, whereby the electric motor MG can be cooled with a high degree of efficiency.

(A3) The present embodiment is also configured such that the electric motor MG is positioned in the vehicle 8 on the front side of the differential gear device 22. Generally, the vehicle 8 runs more frequently in the forward direction than in the backward direction. Accordingly, the electric motor MG which is accommodated together with the differential gear device 22 within the casing 12 can be cooled more effectively than the differential gear device 22, with an air introduced into the vehicle 8 through its front portion during the forward running of the vehicle 8. Consequently, the efficiency of cooling of the electric motor MG can be made higher in the present vehicular drive system 10 than in a vehicular drive system wherein the electric motor MG is positioned in the vehicle 8 on the rear side of the differential gear device 22.

(A4) The present embodiment is further configured such that the ratio of the rotating speeds of the drive wheels 24 to the operating speed of the electric motor MG is highest when the above-described one end portion of the output rotary member 34 is connected to the drive wheels 24 while the above-described other end portion of the output rotary member 34 is disconnected from the drive wheels 24, that is, when the first clutch C1 is placed in the engaged state while the second clutch C2 is placed in the released state. Further, the vehicle operator's seat 50 provided on the vehicle 8 is positioned nearer to the above-indicated other end portion of the output rotary member 34 than to the above-indicated one end portion. In the present vehicular drive system 10, noises and vibrations generated on the side of the above-indicated one end portion tend to be larger than those generated on the side of the above-indicated other end portion, due to a difference between the two values of the above-described speed ratio of the drive wheels 24 with respect to the electric motor MG regarding the respective two end portions, namely, a difference between the above-described speed ratios γa and γb. However, the vehicle operator's seat 50 is positioned more distant from the above-indicated one end portion at which the generated noises and vibrations are larger, so that deterioration of the vehicle driving comfort as felt by the vehicle operator due to the noises and vibrations can be reduced.

(A5) The present embodiment is also configured such that the differential gear device 22 is preferably positioned at a midpoint between the pair of drive wheels 24, as shown in FIG. 1, so that the pair of drive axles 26 can be made identical in construction with each other.

Then, other embodiments of this invention will be described. In the following description, the same reference signs will be used to identify the same elements in the different embodiments, which will not be described redundantly.

Second Embodiment

Figure 4:
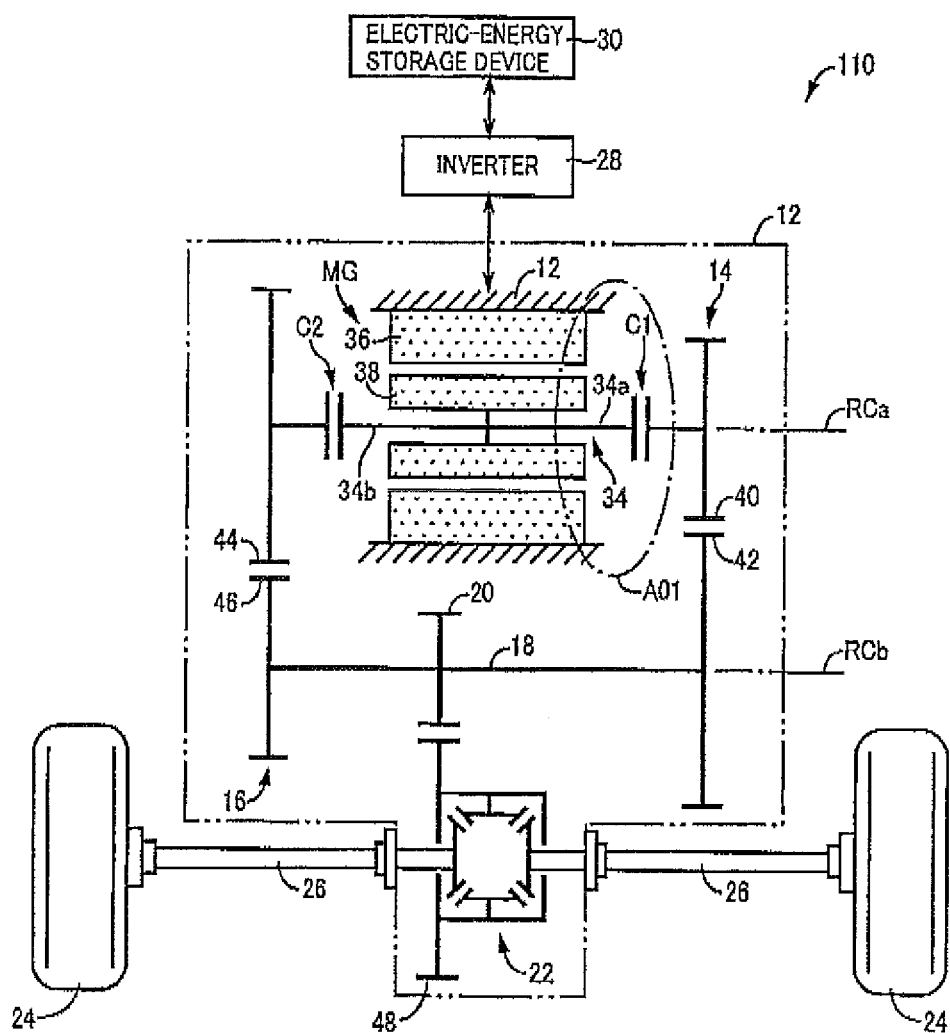
FIG. 4 is a schematic view for explaining a vehicular drive system according to a second embodiment of the invention.
Figure 5:
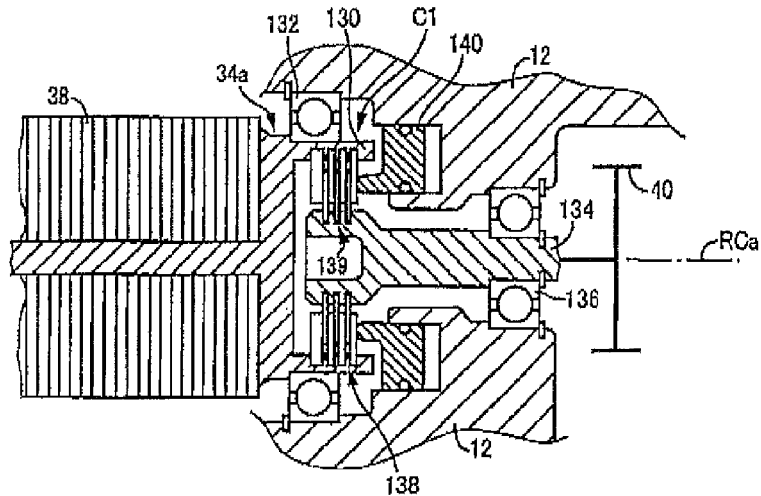
FIG. 5 is a cross sectional view showing a portion of the vehicular drive system of FIG. 4 in which a first clutch is disposed, namely, a portion of the vehicular drive system enclosed by a one-dot chain line A01 in FIG. 4.

Aspects of the present embodiment (second embodiment) which are identical with those of the above-described first embodiment will not be described, and only those aspects of the present invention which are different from the first embodiment will be described. FIG. 4 is the schematic view for explaining a vehicular drive system 110 according to the present embodiment, and FIG. 5 is the cross sectional view showing a portion of the vehicular drive system 110 in which the first clutch C1 is disposed, namely, a portion of the vehicular drive system 110 enclosed by a one-dot chain line A01 in FIG. 4. The vehicular drive system 110 according to the present embodiment is basically identical in construction with the vehicular drive system 10 according to the first embodiment, except in the positions of the first clutch C1 and the second clutch C2, as is apparent by comparison of the arrangement of FIG. 4 with that of FIG. 1.

Described in detail, the first clutch C1 provided in the vehicular drive system 110 functions as the above-described first power connecting/disconnecting device as in the first embodiment, but is interposed between the first input gear 40 and the first output shaft 34a of the electric motor MG, in the direction of the first axis RCa, for selectively connecting and disconnecting the first output shaft 34a to and from the first input gear 40. For example, as shown in FIG. 5 the first output shaft 34a has a cylindrical portion 130 extending from the electric motor rotor 38 toward the first input gear 40, and is rotatably supported relative to the casing 12 through a ball bearing 132 fitted on the outer circumferential surface of the cylindrical portion 130. A connecting shaft 134 which is rotated with the first input gear 40 about the first axis RCa is located within the above-indicated cylindrical portion 130, and is supported through a ball bearing 136 fitted on the outer circumferential surface of the connecting shaft 134 such that the connecting shaft 134 is rotatable about the first axis RCa relative to the casing 12. The first clutch C1 has a plurality of radially outer friction plates 138 which are rotated with the above-indicated cylindrical portion 130, and a plurality of radially inner friction plates 139 which are rotated with the above-indicated connecting shaft 134. The radially outer friction plates 138 and the radially inner friction plates 139 are alternately arranged in the direction of the fast axis RCa. The first clutch C1 is brought into its engaged state when the above-indicated radially outer and radially inner friction plates 138, 139 are forced against each other for frictional contact with each other, by a hydraulically operated piston 140 of the first clutch C1 in the direction of the first axis RCa.

The second clutch C2 provided in the vehicular drive system 110 functions as the above-described second power connecting/disconnecting device as in the first embodiment, but is interposed between the second input gear 44 and the second output shaft 34b of the electric motor MG, in the direction of the first axis RCa, for selectively connecting and disconnecting the second output shaft 34b to and from the second input gear 44. In the vehicular drive system 110, the first output gear 42, the intermediate gear 20 and the second output gear 46 are connected in series with each other by the counter shaft 18, on the second axis RCb, and are rotated together as a unit about the second axis RCb. For instance, the second clutch C2 has the same construction as the first clutch C1 described above by reference to FIG. 5.

The vehicular drive system 110 according to the present embodiment has the following advantage in addition to the above-described advantages (A1) through (A5) of the first embodiment. In the present embodiment, the first clutch C1 functions as the above-indicated first power connecting/disconnecting device for selectively connecting and disconnecting one end portion (first output shaft 34a) of the output rotary member 34 to and from the drive wheels 24, and is interposed between the first input gear 40 and the first output shaft 34a. This first input gear 40 is located nearest to the electric motor MG in the power transmitting path between the first output shaft 34a and the drive wheels 24, and constitutes a part of this power transmitting path. On the other hand, the second clutch C2 functions as the above-indicated second power connecting/disconnecting device for selectively connecting and disconnecting the other end portion (second output shaft 34b) of the output rotary member 34 to and from the drive wheels 24, and is interposed between the second input gear 44 and the second output shaft 34b. This second input gear 44 is located nearest to the electric motor MG in the power transmitting path between the second output shaft 34b and the drive wheels 24, and constitutes a part of this power transmitting path. Accordingly, when the first output shaft 34a is connected to the drive wheels 24, that is, when the first clutch C1 is placed in the engaged state, the transmission of the drive force from the output rotary member 34 of the electric motor MG to the second input gear 44 is prevented by the second clutch C2 which disconnects the second output shaft 34b from the second input gear 44. When the second output shaft 34b is connected to the drive wheels 24, that is, when the second clutch C2 is placed in the engaged state, the transmission of the drive force from the output rotary member 34 of the electric motor MG to the first input gear 40 is prevented by the first clutch C1 which disconnects the first output shaft 34a from the first input gear 40. Therefore, it is possible to reduce generation of a tooth contacting sound of the gears not operating for transmitting the drive force, which would take place when the electric motor MG has a torque variation.

Third Embodiment

Figure 6:
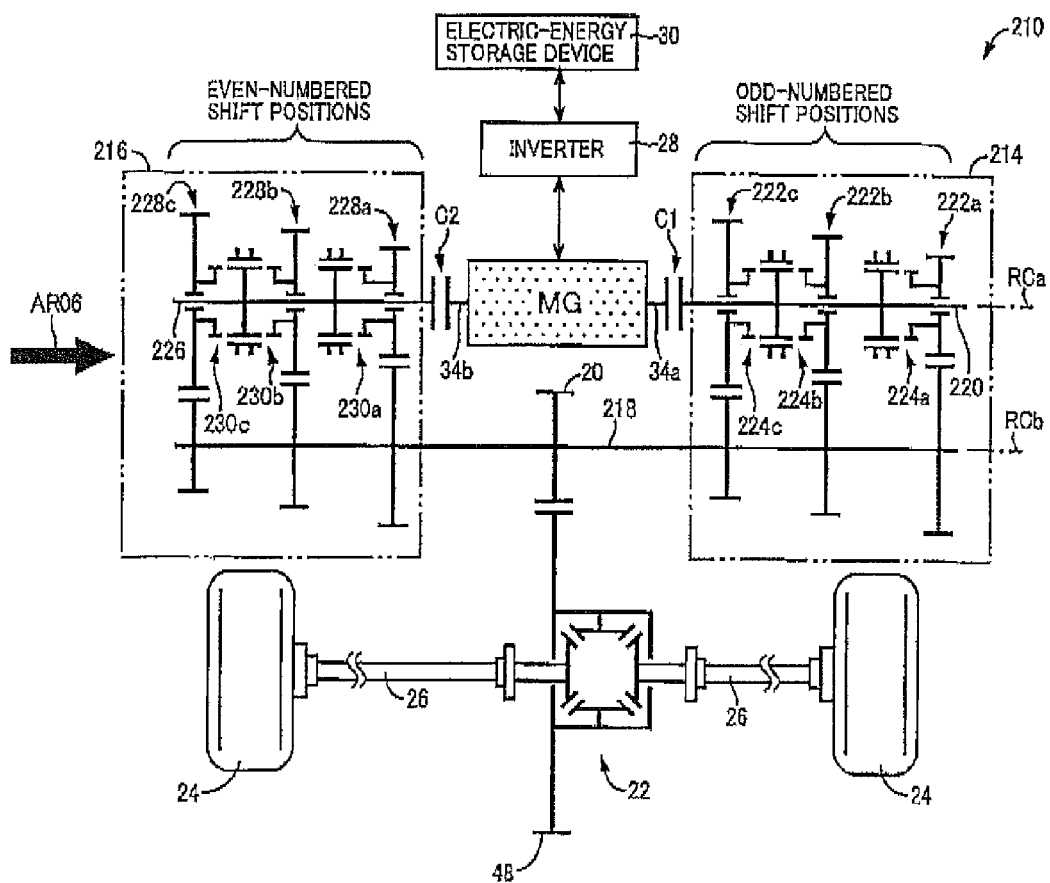
FIG. 6 is a schematic view for explaining a vehicular drive system according to a third embodiment of the invention.

Aspects of the present embodiment (third embodiment) which are identical with those of the above-described second embodiment will not be described, and only those aspects of the present invention which are different from the second embodiment will be described. FIG. 6 is the schematic view for explaining a vehicular drive system 210 according to the present embodiment. While the electric motor MG is shown in FIG. 6 in a simpler manner than in FIGS. 1 and 4, the electric motor MG provided in the vehicular drive system 210 is identical with the electric motor MG provided in the above-described vehicular drive systems 10, 110. The vehicular drive system 210 according to the present embodiment is different from the vehicular drive system 110 according to the second embodiment, in that each of a first transmission portion 214 and a second transmission portion 216 has a plurality of speed positions, as is apparent by comparison of the arrangement of FIG. 6 with that of FIG. 4.

As shown in FIG. 6, a counter shaft 218 is similar to the counter shaft 18 in the illustrated second embodiment in that the counter shaft 218 supports the intermediate gear 20 rotatably about the second axis RCb such that the counter shaft 218 is rotatable with the intermediate gear 20 as a unit about the second axis RCb. The positions of the axes of the vehicular drive system 210 of the present embodiment as seen in the direction of the first axis RCa from the side of the second transmission portion 216 as indicated by an arrow AR06 in FIG. 6 are similar to those indicated in the schematic side elevational view of FIG. 2 referred to above with respect to the first embodiment. Namely, the vehicular drive system 210 is also configured such that the casing 12 accommodates the electric motor MG, first transmission portion 214, second transmission portion 216, first clutch C1, second clutch C2, counter shaft 218, intermediate gear 20, differential gear device 22, etc.

Each of the first transmission portion 214 and second transmission portion 216 is a two-parallel-shafts transmission of a so-called permanent meshing type having three shift positions. The first transmission portion 214, second transmission portion 216, first clutch C1 and second clutch C2 cooperate to constitute a transmission device having a total of six speed positions consisting of a first speed position G1 through a sixth speed position G6. Described in detail, the first transmission portion 214 is a transmission configured to selectively establish odd-numbered speed positions, that is, a first speed position G1, a third speed position G3 and a fifth speed position G5 of the plurality of speed positions G1-G6, while the second transmission portion 216 is a transmission configured to selectively establish even-numbered speed positions, that is, a second speed position G2, a fourth speed position G4 and a sixth speed position G6 of the plurality of speed positions G1-G6. In this respect, it is noted that the present vehicular drive system 210 is also configured to selectively place the first and second clutches C1 and C2 in the engaged state, as in the illustrated first and second embodiments, and to establish one of the above-indicated speed positions G1-G6, for transmitting the drive force of the electric motor MG to the drive wheels 24. The above-indicated transmission device having the six speed positions has a speed ratio $\gamma 6AT$ (=an input speed/an output speed=rotating speed of the output rotary member 34/rotating speed of the counter shaft 218), which is variable from a highest value $\gamma 1$ to a lowest value $\gamma 6$. The highest speed ratio $\gamma 1$ is obtained when the first speed position G1 is established, and the speed ratio $\gamma 2$ is obtained when the second speed position G2 is established, and is lower than the speed ratio $\gamma 1$. The speed ratio $\gamma 3$ is obtained when the third speed position G3 is established, and is lower than the speed ratio $\gamma 2$. The speed ratio $\gamma 4$ is obtained when the fourth speed position G4 is established, and is lower than the speed ratio $\gamma 3$. The speed ratio $\gamma 5$ is obtained when the fifth speed position G5 is established, and is lower than the speed ratio $\gamma 4$. The speed ratio $\gamma 6$ is obtained when the sixth speed position G6 is established, and is lower than the speed ratio $\gamma 5$.

The first transmission portion 214 is provided with: an input shaft 220 having the first axis RCa as a rotation axis and selectively connected in series to the first output shaft 34a of the electric motor MG by the first clutch C1; a plurality of shifting gear pairs (pairs of gears) 222a-222c each consisting of a first gear rotatably supported by one of two parallel shafts consisting of the input shaft 220 and the counter shaft 218 (more specifically, by the input shaft 220), and a second gear supported by the other of the two parallel shafts 218, 220 (more specifically, by the counter shaft 218) such that the second gear is rotated with the other of the two parallel shafts 218, 220; and a plurality of synchronous meshing clutches (synchronous meshing devices) 224a-224c each of which is configured to selectively connect a synchronized one of the gears of the corresponding shifting gear pair 222a, 222b, 222c, namely, the above-indicated first gear to the above-indicated one of the two parallel shafts 218, 220. It will be understood from the foregoing description that the counter shaft 218 functions as an output shaft of the first transmission portion 214 from which the drive force is transmitted toward the drive wheels 24. The above-described synchronous meshing clutches 224a-224c are operated to connect one of the above-indicated first gears of the shifting gear pairs 222a-222c to the input shaft 220 so that the first gears are rotated with the input shaft 220, such that only one of the first gears is connected to the input shaft 220, without simultaneous connection of the two or three first gears to the input shaft 220.

In the vehicular drive system 210, the first transmission portion 214 is configured to bring a selected one of the above-described plurality of shifting gear pairs 222a-222c into a power transmitting state, and to bring the first clutch C1 into the engaged state while holding the second clutch C2 in the released state, for thereby establishing a selected one of the above-indicated odd-numbered speed positions (gear positions) G1, G3 and G5. Described more specifically, the above-indicated synchronized gear (first gear) of the shifting gear pair 222a is connected to the input shaft 220 by the synchronous meshing clutch 224a, for rotation with the input shaft 220, while the first clutch C1 is brought into the engaged state with the second clutch C2 being held in the released state, for establishing the above-indicated first speed position G1. Further, the above-indicated synchronized gear (first gear) of the shifting gear pair 222b is connected to the input shaft 220 by the synchronous meshing clutch 224b, for rotation with the input shaft 220, while the first clutch C1 is brought into the engaged state with the second clutch C2 being held in the released state, for establishing the above-indicated third speed position G3, and the above-indicated synchronized gear (first gear) of the shifting gear pair 222c is connected to the input shaft 220 by the synchronous meshing clutch 224c, for rotation with the input shaft 220, while the first clutch C1 is brought into the engaged state with the second clutch C2 being held in the released state, for establishing the above-indicated fifth speed position G5.

The second transmission portion 216 is provided with: an input shaft 226 having the first axis RCa as a rotation axis and selectively connected in series to the second output shaft 34b of the electric motor MG by the second clutch C2; a plurality of shifting gear pairs (pairs of gears) 228a-228c each consisting of a first gear rotatably supported by one of two parallel shafts consisting of the input shaft 226 and the counter shaft 218 (more specifically, by the input shaft 226), and a second gear supported by the other of the two parallel shafts 218, 226 (more specifically, by the counter shaft 218) such that the second gear is rotated with the other of the two parallel shafts 218, 226; and a plurality of synchronous meshing clutches (synchronous meshing devices) 280a-280c each of which is configured to selectively connect a synchronized one of the gears of the corresponding shifting gear pair 228a, 228b, 228c, namely, the above-indicated first gear to the above-indicated one of the two parallel shafts 218, 226. It will be understood from the foregoing description that the counter shaft 218 functions as an output shaft of the second transmission portion 216 from which the drive force is transmitted toward the drive wheels 24. The above-described synchronous meshing clutches 230a-230c are operated to connect one of the above-indicated first gears of the shifting gear pairs 228a-228c to the input shaft 226 so that the first gears are rotated with the input shaft 226, such that only one of the first gears is connected to the input shaft 226, without simultaneous connection of the two or three first gears to the input shaft 226.

In the vehicular drive system 210, the second transmission portion 216 is configured to bring a selected one of the above-described plurality of shifting gear pairs 228a-228c into a power transmitting state, and to bring the second clutch C2 into the engaged state while holding the first clutch C1 in the released state, for thereby establishing a selected one of the above-indicated even-numbered speed positions (gear positions) G2, G4 and G6. Described more specifically, the above-indicated synchronized gear (first gear) of the shifting gear pair 228a is connected to the input shaft 226 by the synchronous meshing clutch 230a, for rotation with the input shaft 226, while the second clutch C2 is brought into the engaged state with the first clutch C1 being held in the released state, for establishing the above-indicated second speed position G2. Further, the above-indicated synchronized gear of the shifting gear pair 228b is connected to the input shaft 226 by the synchronous meshing clutch 230b, for rotation with the input shaft 226, while the second clutch C2 is brought into the engaged state with the first clutch C1 being held in the released state, for establishing the above-indicated fourth speed position G4, and the above-indicated synchronized gear of the shifting gear pair 228c is connected to the input shaft 226 by the synchronous meshing clutch 230c, for rotation with the input shaft 226, while the second clutch C2 is brought into the engaged state with the first clutch C1 being held in the released state, for establishing the above-indicated sixth speed position G6. The above-described gear pairs 222a-222c and 228a-228c have respective different gear ratios which respectively correspond to the above-indicated speed ratios γ1-γ6.

In the vehicular drive system 210 constructed as described, the transmission device is shifted to change the speed ratio of the drive wheels 24 with respect to the operating speed of the electric motor MG, with selective engaging and releasing actions of the first and second clutches C1, C2. Described more specifically, a shifting operation of the transmission device from one speed position to the next speed position during running with one of the first and second clutches C1, C2 being placed in the engaged state to transmit the drive force of the electric motor MG to the drive wheels 24 is performed by bringing the above-indicated one clutch C1, C2 into the released state and bringing the other clutch C1, C2 into the engaged state. In this case, one of the shifting gear pairs 222a-222c or 228a-228c of the first or second transmission portion 214, 216 which is connected to the above-indicated other clutch C1, C2 is first brought into the power transmitting state for establishing a shift position of after shifting, and then the above-indicated one and other clutches C1, C2 are respectively brought into the released and engaged states. When the vehicular drive system 210 is shifted up from the third speed position G3 to the fourth speed position G4, for example, the above-indicated synchronized gear of the shifting gear pair 228b is first connected to the input shaft 226 of the second transmission portion 216 by the synchronous meshing clutch 230b, for rotation with the input shaft 226, while the second clutch C2 is placed in the released state, and then the first clutch C1 is brought into the released state while the second clutch C2 is brought into the engaged state. Thus, the engaging operation of one of the synchronous meshing clutches 224a-224c and 230a-230c is completed before the engaging and releasing actions of one and the other of the first and second clutches C1, C2, so that the speed ratio Δ6AT of the transmission device having the above-described six speed positions can be advantageously changed in a short length of time.

The vehicular drive system 210 according to the present embodiment has the following advantage in addition to the advantages of the illustrated second embodiment. In the present embodiment, the ratio of the rotating speeds of the drive wheels 24 to the operating speed of the electric motor MG is changed by selectively establishing one of a plurality of predetermined speed positions G1-G6. Further, a part of a power transmitting path between one end portion (first output shaft 34a) of the output rotary member 34 and the drive wheels 24 is constituted by the first transmission portion 214 configured to establish the odd-numbered speed positions G1, G3 and G5 of the plurality of predetermined speed positions G1-G6, and the first clutch C1 which is connected in series to the first transmission portion 214 and which is configured to selectively connect and disconnect the first output shaft 34a to and from the drive wheels 24, while a part of a power transmitting path between the other end portion (second output shaft 34b) of the output rotary member 34 and the drive wheels 24 is constituted by the second transmission portion 216 configured to establish even-numbered, speed positions G2, G4 and G6 of the above-indicated plurality of predetermined speed positions G1-G6, and the second clutch C2 which is connected in series to the second transmission portion 216 and which is configured to selectively connect and disconnect the second drive shaft 34b to and from the drive wheels 24. Accordingly, the first and second clutches C1, C2 can be designed to be more easily positioned for compact construction of the vehicular drive system 210, than where the first and second transmission portions 214, 216 are positioned only on the side of one or the other end portion of the output rotary member 34.

Fourth Embodiment

Figure 7:
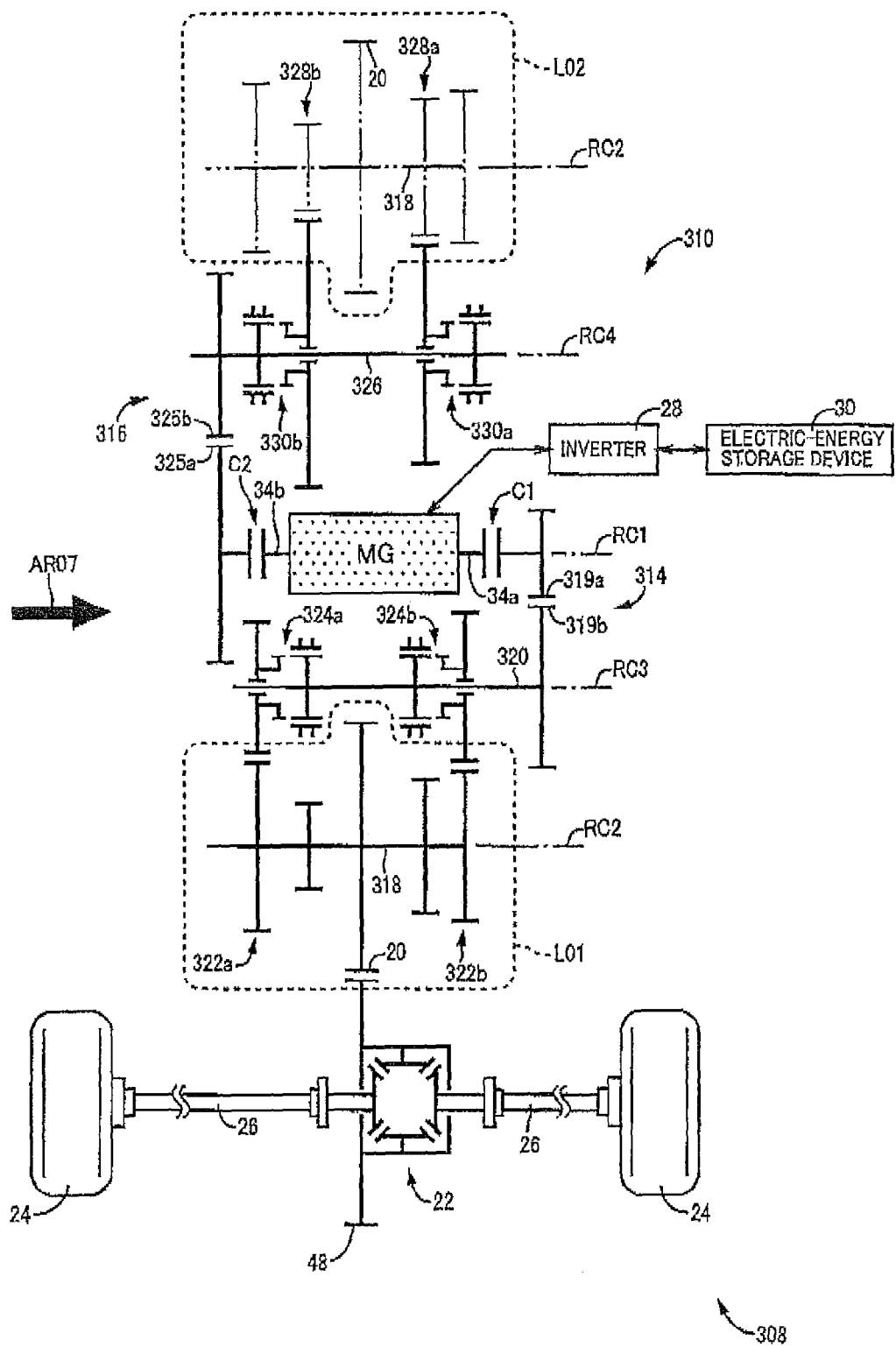
FIG. 7 is a schematic view for explaining a vehicular drive system according to a fourth embodiment of the invention.

Aspects of the present embodiment (fourth embodiment) which are identical with those of the above-described third embodiment will not be described, and only those aspects of the present invention which are different from the third embodiment will be described. FIG. 7 is the schematic view for explaining a vehicular drive system 310 according to the present embodiment. While the electric motor MG is shown in FIG. 7 in a simpler manner than in FIGS. 1 and 4, as in FIG. 6, the electric motor MG provided in the vehicular drive system 310 is identical with the electric motor MG provided in the above-described vehicular drive systems 10, 110, 210. The vehicular drive system 310 according to the present embodiment is different from the vehicular drive system 210 according to the third embodiment, in the positions of a first transmission portion 314 and a second transmission portion 316 with respect to the electric motor MG, and in the number of speed positions of the first and second transmission portions 314, 316, as is apparent by comparison of the arrangement of FIG. 7 with that of FIG. 6. In FIG. 7, RC1 represents a first axis which is an axis of rotation of the electric motor MG, while RC2 represents a second axis which is an axis of rotation of a counter shaft 318. Further, RC3 represents a third axis which is an axis of rotation of an input shaft 320 of a first transmission portion, while RC4 represents a fourth axis which is an axis of rotation of an input shaft 326 of a second transmission portion. In the present vehicular drive system 310, the first axis RC1, second axis RC2, third axis RC3 and fourth axis RC4, and an axis of rotation of the differential gear device 22 are parallel to each other. Although the counter shaft 318 and the gears supported by the counter shaft 318 are shown in two areas of FIG. 7 enclosed by broken lines L01 and L02, these counter shaft 318 and gears are not actually provided in two sets corresponding to the two areas. The counter shaft 318 is also shown in the area enclosed by the broken line L02, which is an imaginary view for easier understanding of shifting gear pairs 328a and 328b of the second transmission portion 316.

As shown in FIG. 7, the counter shaft 318 is similar to the counter shaft 218 in the illustrated third embodiment in that the counter shaft 318 supports the intermediate gear 20 rotatably about the second axis RC2 such that the counter shaft 318 is rotatable with the intermediate gear 20 as a unit about the second axis RC2.

Each of the first transmission portion 314 and second transmission portion 316 is a two-parallel-shafts transmission of a so-called permanent meshing type having two speed positions. The first transmission portion 314, second transmission portion 316, first clutch C1 and second clutch C2 cooperate to constitute a transmission device having a total of four speed positions consisting of a first speed position G01 through a fourth speed position G04. Described in detail, the first transmission portion 314 is a transmission configured to selectively establish odd-numbered speed positions, that is, a first speed position G01 and a third speed position G03 of the plurality of speed positions G01-G04, while the second transmission portion 316 is a transmission configured to selectively establish even-numbered speed positions, that is, a second speed position G02 and a fourth speed position G04 of the plurality of speed positions G01-G04. In this respect, it is noted that the present vehicular drive system 310 is also configured to selectively place the first and second clutches C1 and C2 in the engaged state, as in the illustrated third embodiment, and to establish one of the above-indicated speed positions G01-G04, for transmitting the drive force of the electric motor MG to the drive wheels 24. The above-indicated transmission device having the four speed positions has a speed ratio γ4AT (=an input speed/an output speed=rotating speed of the output rotary member 34/rotating speed of the counter shaft 318), which is variable from a highest value γ01 to a lowest value γ4. The highest speed ratio γ01 is obtained when the first speed position G0 is established, and the speed ratio γ02 is obtained when the second speed position G02 is established, and is lower than the speed ratio γ01. The speed ratio γ03 is obtained when the third speed position G03 is established, and is lower than the speed ratio γ02. The speed ratio γ04 is obtained when the fourth speed position G04 is established, and is lower than the speed ratio γ03.

The first transmission portion 314 is provided with: a first driving input gear 319a having the first axis RC1 as a rotation axis and connected in series to the first output shaft 34a of the electric motor MG through the first clutch C1; a first driven input gear 319b having the third axis RC3 as a rotation axis and meshing with the first driving input gear 319a; an input shaft 320 having the third axis RC3 as a rotation axis and connected to the first driven input gear 319b for rotation with this input gear 319b; a plurality of shifting gear pairs (pairs of gears) 322a and 322b each consisting of a first gear rotatably supported by one of two parallel shafts consisting of the input shaft 320 and the counter shaft 318 (more specifically, by the input shaft 320), and a second gear supported by the other of the two parallel shafts 318, 320 (more specifically, by the counter shaft 318) such that the second gear rotates with the other of the two parallel shafts 318, 320; and a plurality of synchronous meshing clutches (synchronous meshing devices) 324a and 324b each of which is configured to selectively connect a synchronized one of the gears of the corresponding shifting gear pair 322a, 822b, namely, the above-indicated first gear to the above-indicated one of the two parallel shafts 318, 320. It will be understood from the foregoing description that the counter shaft 318 functions as an output shaft of the first transmission portion 314 from which the drive for is transmitted toward the drive wheels 24, as in the illustrated third embodiment. The above-described synchronous meshing clutches 324a and 324b are operated to connect one of the above-indicated first gears of the shifting gear pairs 322a and 322b to the input shaft 320 so that the first gears are rotated with the input shaft 320, such that only one of the first gears is connected to the input shaft 320, without simultaneous connection of the two or three first gears to the input shaft 320.

In the vehicular drive system 310, the first transmission portion 314 is configured to bring a selected one of the above-described plurality of shifting gear pairs 322a, 322b into a power transmitting state, and to bring the first clutch C1 into the engaged state while holding the second clutch C2 in the released state, for thereby establishing a selected one of the above-indicated odd-numbered speed positions (gear positions) G01 and G03. Described more specifically, the above-indicated synchronized gear (first gear) of the shifting gear pair 322a is connected to the input shaft 320 by the synchronous meshing clutch 324a, for rotation with the input shaft 320, while the first clutch C1 is brought into the engaged state with the second clutch C2 being held in the released state, for establishing the above-indicated first speed position G01. Further, the above-indicated synchronized gear (first gear) of the shifting gear pair 322b is connected to the input shaft 320 by the synchronous meshing clutch 324b, for rotation with the input shaft 320, while the first clutch C1 is brought into the engaged state with the second clutch C2 being held in the released state, for establishing the above-indicated third speed position G03.

The second transmission portion 216 is provided with: a second driving input gear 325a having the first axis RC1 as a rotation axis and connected in series to the second output shaft 34b of the electric motor MG through the second clutch C2; a second driven input gear 325b having the fourth axis RC4 as a rotation axis and meshing with the second driving input gear 325a; an input shaft 326 having the fourth axis RC4 as a rotation axis and connected to the second driven input gear 325b for rotation with this input gear 325b; a plurality of shifting gear pairs (pairs of gears) 328a and 328b each consisting of a first gear rotatably supported by one of two parallel shafts consisting of the input shaft 326 and the counter shaft 318 (more specifically, by the input shaft 326), and a second gear supported by the other of the two parallel shafts 318, 326 (more specifically, by the counter shaft 318) such that the second gear is rotated with the other of the two parallel shafts 318, 326; and a plurality of synchronous meshing clutches (synchronous meshing devices) 330a and 330b each of which is configured to selectively connect a synchronized one of the gears of the corresponding shifting gear pair 328a, 328b, namely, the above-indicated first gear to the above-indicated one of the two parallel shafts 318, 326. It will be understood from the foregoing description that the counter shaft 318 functions as an output shaft of the second transmission portion 316 from which the drive force is transmitted toward the drive wheels 24, as in the illustrated third embodiment. The above-described synchronous meshing clutches 330a and 330b are operated to connect one of the above-indicated first gears of the shifting gear pairs 328a and 328b to the input shaft 326 so that the first gears are rotated with the input shaft 326, such that only one of the first gears is connected to the input shaft 326, without simultaneous connection of the two or three first gears to the input shaft 326.

In the vehicular drive system 310, the second transmission portion 316 is configured to bring a selected one of the above-described plurality of shifting gear pairs 328a, 328b into a power transmitting state, and to bring the first clutch C1 into the released state while bringing the second clutch C2 into the engaged state, for thereby establishing a selected one of the above-indicated even-numbered speed positions (gear positions) G02 and G04. Described more specifically, the above-indicated synchronized gear (first gear) of the shifting gear pair 328a is connected to the input shaft 326 by the synchronous meshing clutch 330a, for rotation with the input shaft 326, while the first clutch C1 is brought into the released state with the second clutch C2 being brought into the engaged state, for establishing the above-indicated second speed position G02. Further, the above-indicated synchronized gear (first gear) of the shifting gear pair 328b is connected to the input shaft 326 by the synchronous meshing clutch 380b, for rotation with the input shaft 326, while the first clutch C1 is brought into the released state with the second clutch C2 being brought into the engaged state, for establishing the above-indicated fourth speed position G04. The above-described gear pairs 322a, 322b, 328a and 328b have respective different gear ratios which respectively correspond to the above-indicated speed ratios γ01-γ04.

In the vehicular drive system 310 constructed as described, the transmission device is shifted to change the speed ratio of the drive wheels 24 with respect to the operating speed of the electric motor MG, with selective engaging and releasing actions of the first and second clutches C1, C2, as in the vehicular drive system 210 of the third embodiment.

Figure 8:
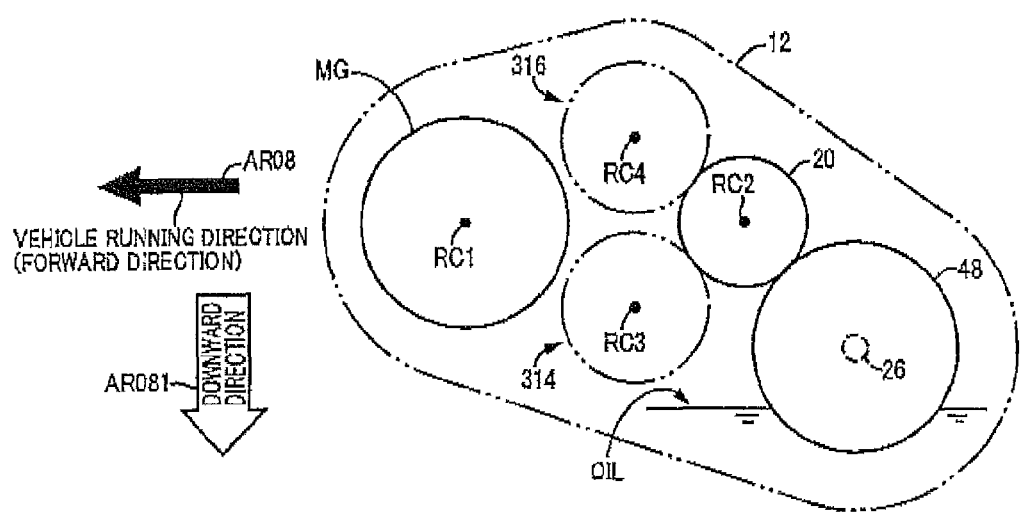
FIG. 8 is a schematic side elevational view indicating axes of the vehicular drive system of FIG. 7 as seen in the direction of a first axis from the side of a second clutch toward the side of a first clutch, as indicated by an arrow AR07 in FIG. 7.
Figure 9:
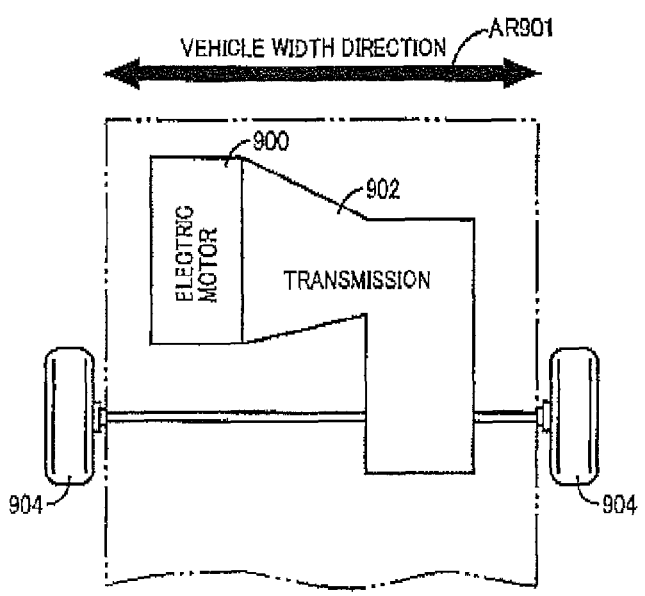
FIG. 9 is an illustration of an electric vehicle on which a conventional drive system is installed.

FIG. 8 is the schematic side elevational view indicating the axes of the vehicular drive system 310 as seen in the direction of the first axis RC1 from the second clutch C2 toward the first clutch C1, as indicated by an arrow AR07 in FIG. 7. An arrow AR08 in FIG. 8 represents a forward running direction of a vehicle 308, while an arrow AR081 represents a downward direction of the vehicle 308. As indicated in FIG. 8, the electric motor MG is positioned in the vehicle 308 on the front side of the differential gear device 22, as in the vehicular drive system 10 of FIG. 2, and an oil (lubricant) for lubricating the vehicular drive system 310 is accommodated in a bottom part of the casing 12 so that a portion of the differential gear device 22 is immersed in the oil.

As is apparent from FIG. 8, the electric motor MG, first transmission portion 314, second transmission portion 316, first clutch C1, second clutch C2, counter shaft 318, intermediate gear 22, differential gear device 22, etc. are accommodated in the casing 12 of the vehicular drive system 310. As is also apparent from FIG. 8, the vehicular drive system 310 is arranged such that the third axis RC3 is located in a lower portion of the vehicle 308 than the fourth axis RC4. Namely, the first transmission portion 314 is positioned in the lower portion of the vehicle 308 than the second transmission portion 316.

As is also apparent from FIG. 7, the shifting gear pairs 322a and 322b of the first transmission portion 314 are located on one side of the first driven input gear 319b nearer to the electric motor MG, in the direction of the third axis RC3. That is, the first transmission portion 314 is positioned so as to overlap with the electric motor MG in the direction perpendicular to the axis of rotation of the differential gear device 22. Described in detail, the plurality of shifting gear pairs 322a, 322b are positioned so as to partially or entirely overlap with the electric motor MG, in the direction perpendicular to the axis of rotation of the differential gear device 22. Similarly, the shifting gear pairs 328a and 828b of the second transmission portion 316 are located on one side of the second driven input gear 325b nearer to the electric motor MG, in the direction of the fourth axis RC4. That is, the second transmission portion 316 is positioned so as to overlap with the electric motor MG in the direction perpendicular to the axis of rotation of the differential gear device 22. Described in detail, the plurality of shifting gear pairs 328a, 328b are positioned so as to partially or entirely overlap with the electric motor MG, in the direction perpendicular to the axis of rotation of the differential gear device 22.

The vehicular drive system 310 according to the present embodiment has the following advantages in addition to the advantages of the illustrated third embodiment. The present embodiment is configured such that the electric motor MG, the first transmission portion 314, the second transmission portion 316, the differential gear device 316 and the differential gear device 22 are accommodated in one housing, that is in the casing 12, and the first transmission portion 314 is positioned in the lower portion of the vehicle 308 than the second transmission portion 316. Accordingly, the first transmission portion 314 which is assigned to establish the comparatively low speed positions and tends to generate a larger amount of heat than the second transmission portion 316 can be efficiently cooled with the oil splashed up by the rotary motion of the differential gear device 22, which oil is easily supplied to the first transmission portion 314 by an amount larger than an amount to be supplied to the second transmission portion 316.

The present embodiment is further configured such that the first transmission portion 314 is positioned so as to overlap with the electric motor MG in the direction perpendicular to the axis of rotation of the differential gear device 22, while, the second transmission portion 316 is positioned so as to overlap with the electric motor MG in the direction perpendicular to the axis of rotation of the differential gear device 22. Accordingly, the dimension of the vehicular drive system 310 in the axial direction of the differential gear device 22 can be shortened. For instance, it is possible to reduce the required size of the vehicular drive system 310 even where the number of the speed positions of the vehicular drive system 310 is increased.

While the embodiments of this invention have been described in detail by reference to the drawings, for illustrative purpose only, it is to be understood that the invention may be embodied with various changes and improvements which may occur to those skilled in the art.

While the first clutch C1 and second clutch C2 are hydraulically operated frictional coupling devices of a wet multiple-disc type in the illustrated first through fourth embodiments, these clutches may be replaced by any other types of power connecting/disconnecting device for selective power transmission, including dry-type clutches, and powder type, electromagnetic type, and mechanical type coupling devices, such as powder clutches, electromagnetic clutches and meshing dog clutches.

Although the differential gear device 22 in the illustrated first through fourth embodiments is partially immersed in the oil accommodated in the bottom part of the casing 12, the entirety of the differential gear device 22 may be immersed in the oil.

In the illustrated embodiment shown in FIG. 3 of the first embodiment, the vehicle operator's seat 50 is positioned nearer to the second transmission portion 16 than to the first transmission portion 14. However, the position of the vehicle operator's seat 50 is not particularly limited. For example, the vehicle operator's seat 50 may be positioned nearer to the first transmission portion 14, or at an intermediate position in the width direction of the vehicle 8.

The vehicle 8, 308, which is a front-drive vehicle in the illustrated first through fourth embodiments, may be replaced by a rear-drive vehicle or a four-wheel-drive vehicle.

Although the vehicular drive systems 10, 110, 210, 310 are installed in the front portion of the vehicle, the position of installation of the vehicular drive system on the vehicle 8, 308 is not particularly limited. For instance, the vehicular drive system may be installed in the rear or longitudinally intermediate portion of the vehicle.

Although the electric motor MG, first clutch C1 and second clutch C2 in the illustrated second through fourth embodiments are mutually mechanically independent elements of the vehicular drive system 110, 210 and 310, these elements need not be mechanically independent of each other. For instance, a single device may function as the electric motor MG, and first and second clutches C1, C2.

In the illustrated third and fourth embodiments, the first transmission portion 214, 314 and the second transmission portion 216, 316 have the same number of speed positions. However, the number of the speed positions of the first transmission portion 214, 314 may be smaller or larger than that of the second transmission portion 216, 316.

While the first transmission portion 214, 314 and the second transmission portion 216, 316 in the illustrated third and fourth embodiments have the respective gear pairs for transmitting the drive force, the transmission portions need not be provided with the gear pairs. For instance, each of the gear pairs may be replaced by one planetary gear set or two or more planetary gear sets for establishing the speed positions.

Although the vehicular drive systems 10, 110, 210, 310 in the illustrated first to fourth embodiments are installed on an electric vehicle, these vehicular drive systems may include a vehicle drive source or sources in addition to the electric motor MG, and may be installed on a hybrid vehicle. In the case of FIG. 3 wherein the drive wheels 24 are front wheels, the rear wheels of the vehicle 8 may be driven by another drive source such as an engine.

In the illustrated embodiments shown in FIGS. 6 and 7 of the third and fourth embodiments, the synchronous meshing clutches 224a-224c and 324a, 324b of the first transmission portion 214, 314 may function as the first clutch C1 while the synchronous meshing clutches 230a-230c and 330a, 330b of the second transmission portion 216, 316 may function as the second clutch C2. Accordingly, the vehicular drive systems 210, 310 need not be provided with one or both of the first and second clutches C1 and C2.

NOMENCLATURE OF REFERENCE SIGNS 8, 308: Vehicle
10, 110, 210, 310: Vehicular drive system
14, 214, 314: First transmission portion
16, 216, 316: Second transmission portion
22: Differential gear device
24: Drive wheels
26: Drive axles
34: Output rotary member
34a: First output shaft (one end portion of the output rotary member)
34b: Second output shaft (the other end portion of the output rotary member)
40: First input gear (Gear)
44: Second input gear (Gear)
50: Vehicle operator's seat
MG: Electric motor
C1: First clutch (First power connecting/disconnecting device)
C2: Second clutch (Second power connecting/disconnecting device)

The invention claimed is:

1. A vehicular drive system provided with an electric motor for generating a drive force to be transmitted to drive wheels, comprising:
   said electric motor including an output rotary member having opposite end portions from which the drive force of the electric motor is transmitted to said drive wheels;
   two power connecting/disconnecting devices respectively configured to selectively connect and disconnect each of said opposite end portions of the output rotary member to and from said drive wheels; and
   said two power connecting/disconnecting devices being controlled to selectively connect said opposite end portions of the output rotary member to said drive wheels, for thereby changing a ratio of rotating speeds of said drive wheels to an operating speed of said electric motor.

2. The vehicular drive system according to claim 1, further comprising:
   a differential gear device having an axis of rotation parallel to an axis of rotation of said output rotary member of the electric motor and configured to transmit the drive force of said electric motor to said drive wheels,
   and wherein said electric motor is positioned so as to overlap with respect to said differential gear device in a direction perpendicular to the axis of rotation of said differential gear device.

3. The vehicular drive system according to claim 2, wherein said electric motor is positioned on a front side of said differential gear device as seen in a forward running direction of a vehicle.

4. The vehicular drive system according to claim 1, wherein said two power connecting/disconnecting devices consist of a first power connecting/disconnecting device for selectively connecting and disconnecting one of said opposite end portions of the output rotary member to and from said drive wheels is interposed between said one end portion and a gear located nearest to said electric motor in a power transmitting path between said one end portion and said drive wheels, and a second power connecting/disconnecting device for selectively connecting and disconnecting said other end portion of the output rotary member to and from said drive wheels is interposed between said other end portion and a gear located nearest to said electric motor in a power transmitting path between said other end portion and said drive wheels.

5. The vehicular drive system according to claim 1, wherein:
   the ratio of the rotating speeds of said drive wheels to the operating speed of said electric motor is changed by selectively establishing one of a plurality of predetermined speed positions;
   a part of a power transmitting path between said one end portion of the output rotary member and said drive wheels is constituted by a first transmission portion configured to establish odd-numbered speed positions of said plurality of predetermined speed positions, and one of said two power connecting/disconnecting devices which is connected in series to said first transmission portion and which is configured to selectively connect and disconnect said one end portion of the output rotary member to and from said drive wheels; and
   a part of a power transmitting path between said other end portion of the output rotary member and said drive wheels is constituted by a second transmission portion configured to establish even-numbered speed positions of said plurality of predetermined speed positions, and the other of said two power connecting/disconnecting devices which is connected in series to said second transmission portion and which is configured to selectively connect and disconnect said other end portion of the output rotary member to and from said drive wheels.

6. The vehicular drive system according to claim 1, wherein the ratio of the rotating speeds of said drive wheels to the operating speed of said electric motor is highest when said one end portion of the output rotary member is connected to said drive wheels while said other end portion of the output rotary member is disconnected from said drive wheels, and
 a seat for an operator of a vehicle is positioned nearer to said other end portion of the output rotary member than to said one end portion.

* * * * *